(12) United States Patent
Vogt

(10) Patent No.: US 7,827,462 B2
(45) Date of Patent: Nov. 2, 2010

(54) COMBINED COMMAND AND DATA CODE

(75) Inventor: Pete D. Vogt, Boulder, CO (US)

(73) Assignee: Intel Corporation, Santa Clara, CA (US)

( * ) Notice: Subject to any disclaimer, the term of this patent is extended or adjusted under 35 U.S.C. 154(b) by 932 days.

(21) Appl. No.: 11/097,955

(22) Filed: Mar. 31, 2005

(65) Prior Publication Data

US 2006/0236196 A1    Oct. 19, 2006

(51) Int. Cl.
*H03M 13/00* (2006.01)
(52) U.S. Cl. .................. 714/753; 714/758
(58) Field of Classification Search ............ 714/763, 714/753, 758
See application file for complete search history.

(56) References Cited

U.S. PATENT DOCUMENTS

| | | | |
|---|---|---|---|
| 3,914,741 A | 10/1975 | Bonser et al. | |
| 4,541,091 A * | 9/1985 | Nishida et al. | 714/756 |
| 4,672,609 A * | 6/1987 | Humphrey et al. | 714/719 |
| 4,907,228 A * | 3/1990 | Bruckert et al. | 714/11 |
| 5,173,905 A | 12/1992 | Parkinson et al. | |
| 5,455,834 A * | 10/1995 | Chang et al. | 714/768 |
| 5,530,835 A | 6/1996 | Vashi et al. | |
| 5,940,137 A | 8/1999 | Hulvey | |
| 5,940,313 A * | 8/1999 | Senba | 703/6 |
| 5,996,113 A | 11/1999 | Korn et al. | |
| 6,101,198 A | 8/2000 | Koenig et al. | |
| 6,760,743 B1 * | 7/2004 | Heddes et al. | 718/100 |
| 7,428,686 B2 * | 9/2008 | Aoyama et al. | 714/752 |
| 2001/0037406 A1 | 11/2001 | Philbrick et al. | |
| 2004/0139253 A1 | 7/2004 | Perego et al. | |
| 2004/0193821 A1 | 9/2004 | Ruhovets et al. | |
| 2005/0007805 A1 | 1/2005 | Ware et al. | |
| 2006/0095620 A1 | 5/2006 | Dreps et al. | |
| 2006/0242537 A1 * | 10/2006 | Dang | 714/763 |
| 2009/0013108 A1 | 1/2009 | Rajamani | |

FOREIGN PATENT DOCUMENTS

| | | |
|---|---|---|
| DE | 112006000349 T5 | 2/2008 |
| JP | 2004193664 A | 7/2004 |
| TW | 200705170 | 2/2007 |
| WO | 2004/102403 A2 | 11/2004 |
| WO | 2006/083899 A1 | 8/2006 |

OTHER PUBLICATIONS

Office Action received for KR Patent Application No. 2007-7025113 mailed on Sep. 28, 2009, 4 pages of English Translation.
International Preliminary Report on Patentability received for PCT Application No. PCT/US06/12599, dated Oct. 11, 2007, 11 pages.

(Continued)

*Primary Examiner*—M. Mujtaba K Chaudry
(74) *Attorney, Agent, or Firm*—Caven & Aghevli LLC

(57) ABSTRACT

An apparatus includes a source for a command and an associated data. An error code generator generates an error code for the combined command and associated data, which is distributed among the command and the associated data. A transmitter then transmits the command and the associated data separately.

13 Claims, 10 Drawing Sheets

OTHER PUBLICATIONS

International Search Report and Written Opinion received for PCT Application No. PCT/US06/12599, mailed on Mar. 26, 2007, 15 pages.

Office Action Received for Taiwan Patent Application No. 95111496, mailed on Sep. 2, 2009, 5 pages of English translation and 7 pages of Office Action.

Office Action received for German Patent Application No. 11 2006 000 298.8, mailed on Feb. 2, 2010, 4 pages of Office Action and 4 pages of English Translation.

Office Action received for U.S. Appl. No. 11/047,890, mailed on Jan. 18, 2008, 17 pages.

Office Action received for U.S. Appl. No. 11/047,890, mailed on Oct. 21, 2008, 10 pages.

Office Action received for German Patent Application No. 11 2006 000 298.8, mailed on Sep. 11, 2008, 2 pages of Office Action and 2 pages of English Translation.

Office Action received for Korean Patent Application No. 10-2007-7017728, mailed on Nov. 29, 2008, 4 pages of Office Action and 5 pages of English Translation.

Office Action received for GB Patent Application No. GB0714819.0, mailed on Aug. 26, 2009, 3 pages.

International Search Report and Written Opinion received for PCT Application No. PCT/US2006/003445, mailed on Jul. 7, 2006, 10 pages.

International Preliminary Report on Patentability received for PCT Application No. PCT/US2006/003445, mailed on Aug. 9, 2007, 7 pages.

* cited by examiner

COMBINED COMMAND AND DATA CODE

FIELD

This invention pertains to data, and more particularly to detecting errors in data.

BACKGROUND

When an instruction sequence needs to write data to memory, typically two pieces of information are transmitted to the memory: the command, and the data to be written to memory. It is possible that errors may occur in the transmission of either of these elements. For example, if the command is corrupted, the data may be written to the wrong location in memory. And obviously, if the data is corrupted, then the wrong data may be written to memory.

To address these potential errors, the command and the associated data may be each provided with an error detecting code. Typically, a Cyclic Redundancy Code (CRC) is used. The CRC may then be used by the memory module to determine if there was an error during transmission. If an error is detected, then the memory module may request that the command and associated data be retransmitted.

But transmitting the bits for the CRC takes away from the bandwidth that might be used to transmit commands or data. The number of bits needed to transmit the CRC depends on the specific CRC algorithm implemented. More complicated CRC algorithms are capable of detecting more errors (for example, a simple CRC might detect an error that changes one bit, but not an error that changes two bits), but require more bits to transmit.

Embodiments of the invention address these problems and others in the art.

DETAILED DESCRIPTION

Figure 1:
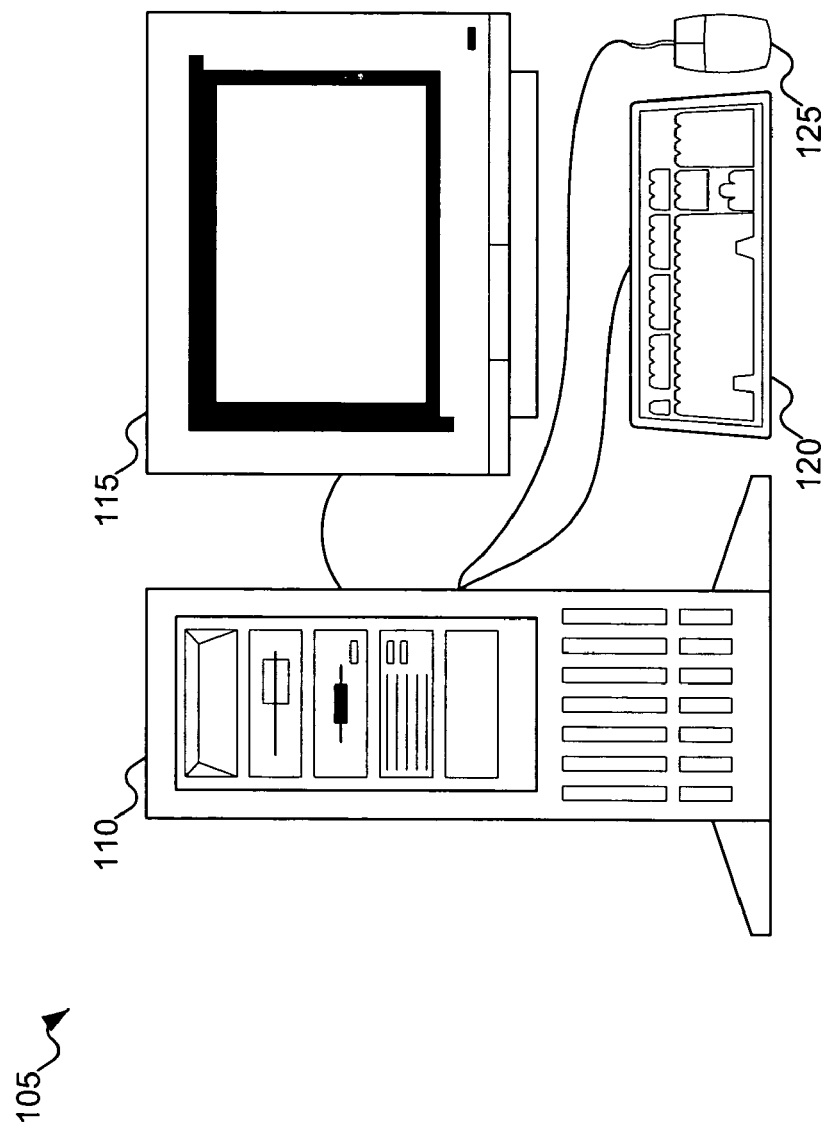
FIG. 1 shows a machine capable of using embodiments of the invention.
Figure 2:
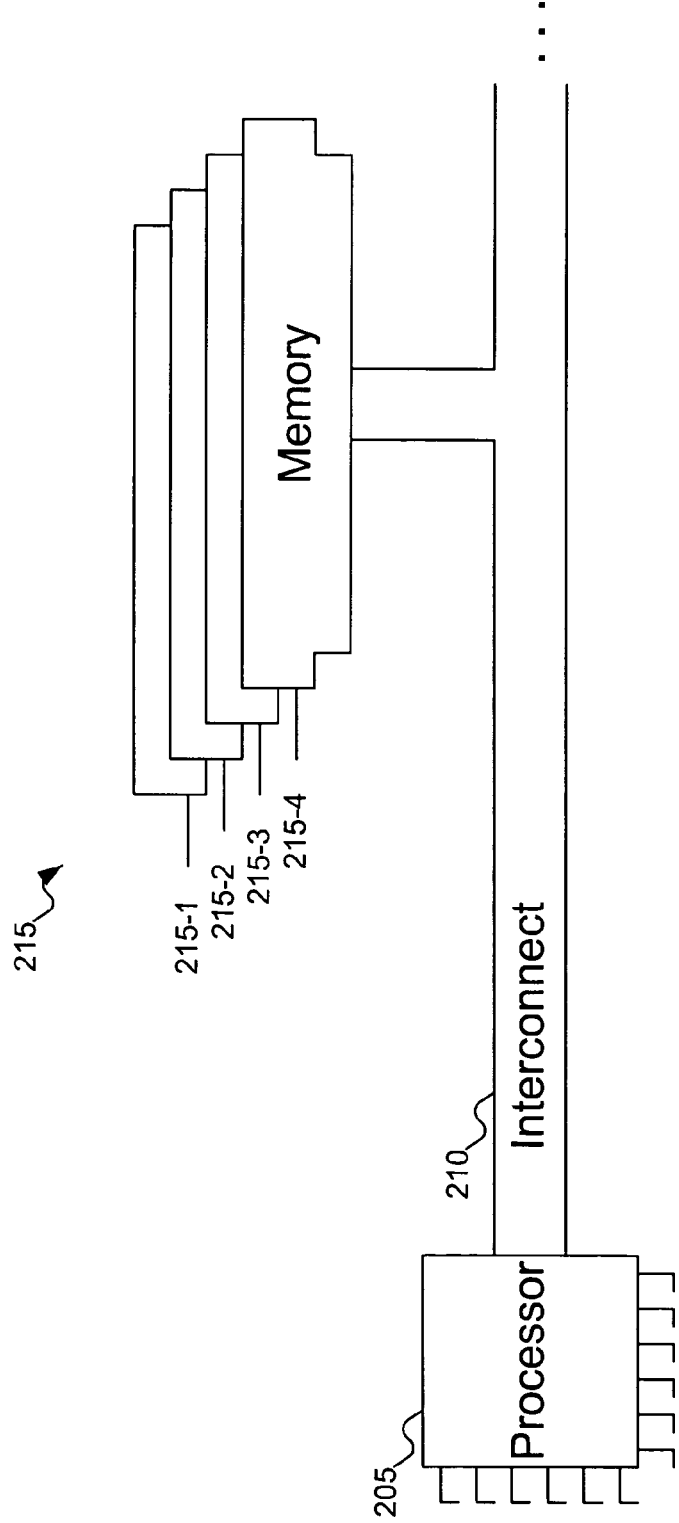
FIG. 2 shows the components of the machine of FIG. 1 capable of using embodiments of the invention.

FIG. 1 shows a machine capable of using embodiments of the invention. In FIG. 1, machine 105 is shown as a computer system, including computer 110, monitor 115, keyboard 120, and mouse 125. FIG. 2 shows further detail, revealing elements within computer 110: namely, processor 205, interconnect 210, and memory modules 215-1, 215-2, 215-3, and 215-4 (collectively, memory modules 215). Processor 205 may be a chip with a single processor core, or it may be a chip with multiple processor cores, among other embodiments. (The chip including processor 205 may, of course, include other elements as well, depending on the embodiment of the invention.) Interconnect 210 is used to connect elements together to support communication. Interconnect 210 may be a point-to-point interconnect, or it may interconnect multiple elements. For example, if interconnect 210 is a point-to-point interconnect, then it would only connect processor 205 and memory modules 215. But if interconnect 210 interconnects multiple elements, other elements (not shown in FIG. 2) can also connect to interconnect 210.

A typical use for an embodiment of the invention is a command to write data to a memory module, such as memory module 215-1, because typically the command is sent to the memory module separately from the data. Memory module 215 may be any variety of memory module, such as a Dynamic Random Access Memory (DRAM). But a person skilled in the art will recognize that embodiments of the invention are not limited to the particular elements of hardware shown in FIGS. 1 and 2. Embodiments of the invention are applicable to any situation where the command and data are separated in transmission. Examples of other platforms that may use embodiments of the invention, without being limiting, include any variety of computer, such as a notebook, server, or Internet appliance, a personal digital assistant (PDA), or any embedded application, among others.

Figure 3:
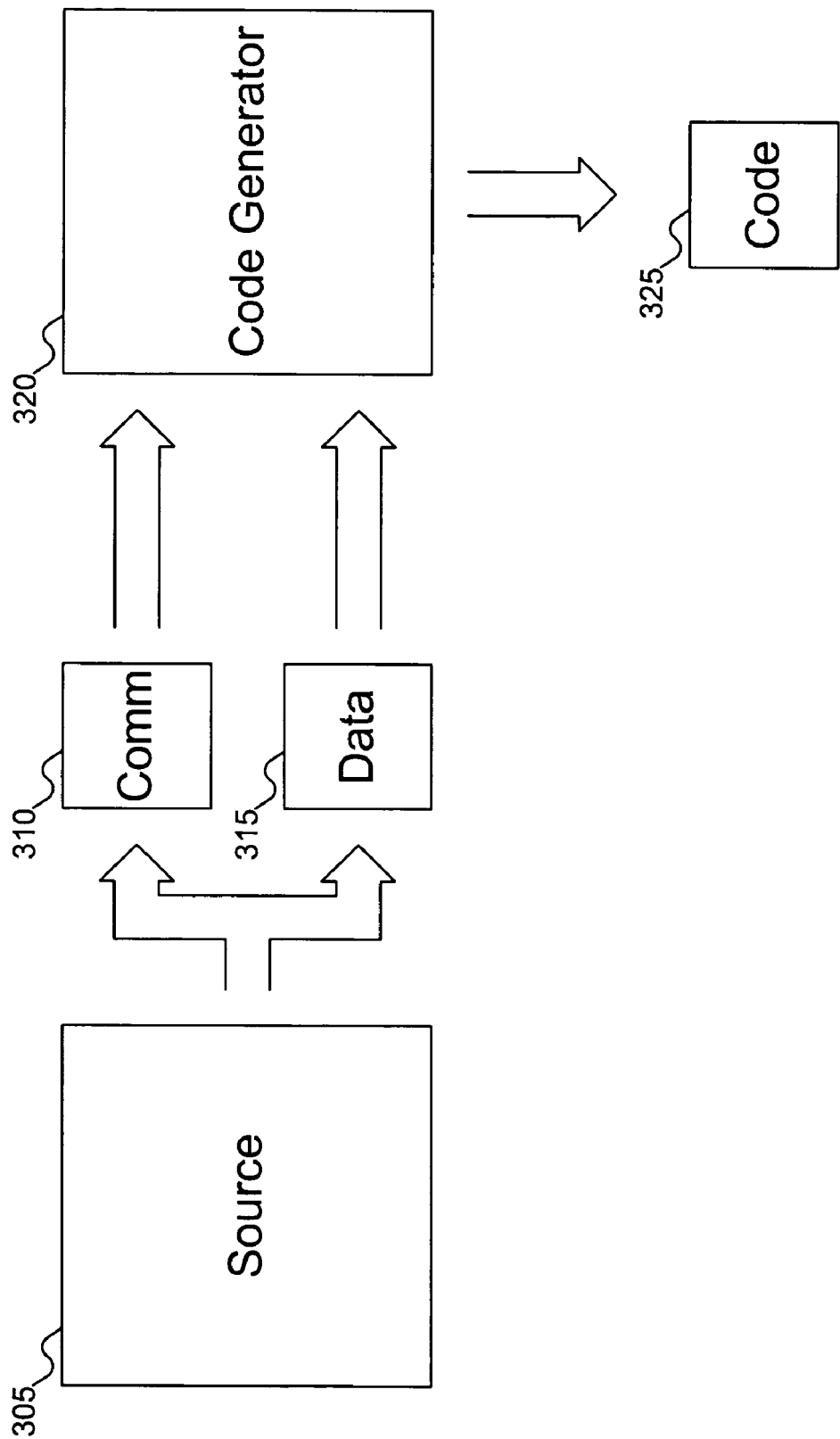
FIG. 3 shows the generation of an error code in the machine of FIG. 1, according to an embodiment of the invention.

FIG. 3 shows the generation of an error code in the machine of FIG. 1, according to an embodiment of the invention. In FIG. 3, source 305 generates command 310 and data 315. Depending on the reader's interpretation, source 305 may be either the line of code that causes the processor to write data to the memory module, or the processor itself; either interpretation is acceptable. Command 310 and data 315 are then used as input for code generator 320, which generates code 325. Code generator 320 combines command 310 and data 315 into a single set of bits to generate code 325. Code generator 320 may implement any desired algorithm to produce a code that may be used to verify the accuracy of the transmitted data. Examples of such codes include error detecting codes, such as parity bits, checksums, and Cyclic Redundancy Codes (CRCs) or polynomial codes, and error correcting codes, such as Hamming codes.

Note that code generator 320 takes two inputs, but generates a single code for the two inputs. This may be compared with prior art solutions, where separate codes are generated for each of the command and the data. In combining command 310 and data 315 to generate a single code 325, the implementation has a choice. Code generator 320 may generate a code that provides the same level of error detection (or correction) as prior art code generators, in which case fewer bits are needed, because of the efficiency of combining command 310 and data 315 for a single code 325. Or, code generator 320 may generate a code that uses the same number of bits as would have been generated for command 310 and data 315 separately, thereby increasing the accuracy of code 325.

Further explanation of this choice may prove illustrative. For example, consider a CRC that generates a one byte code for each byte of data to be verified. Further, assume that the command and the data are each only four bits long (that is, each uses only one half of a byte). If a CRC is to be generated for the command and the data separately, then a total of four bytes are needed: one byte (half of which is empty) for the command, one byte (half of which is empty) for the data, and two bytes for the two CRC codes. But if the command and the data are combined into a single byte, then only one byte is needed to store the CRC code (using the same CRC algorithm); this saves on the number of bits that are needed for the code, and therefore reduces the number of bits to be transmitted. Alternatively, a more accurate algorithm might be used instead of the same CRC algorithm, one which detects a greater number of errors in transmission. Such a code might use three bytes, meaning that the same four bytes would be used as in the prior art. This means that the same number of bits are being used as in the prior art, but a greater degree of accuracy is achieved. For example, more errors might be detected than could be detected using the original CRC algorithm, or an error correcting code might be used, to avoid the need for retransmission.

Figure 4:
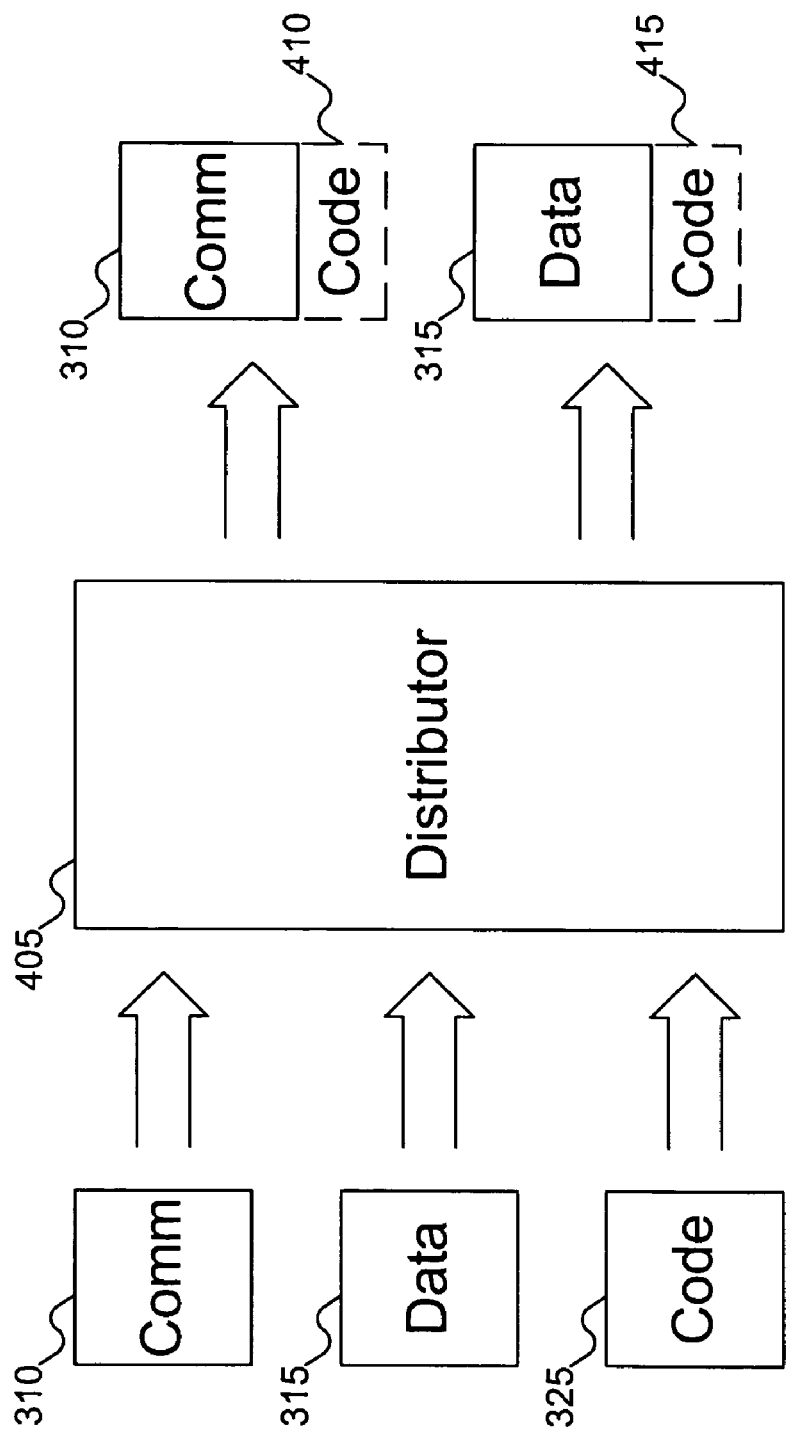
FIG. 4 shows the distribution of the error code of FIG. 3 into a command and data to be transmitted to the memory module of FIG. 2, according to an embodiment of the invention.

Once code 325 is generated, code 325 may be added to command 310 and 315. FIG. 4 shows code 325 being distributed among command 310 and data 315 by distributor 405. This distribution may be done in any manner desired. For example, code 325 might be appended to the end of data 315. Or code 325 might be transmitted before command 310. Or code 325 might be scattered among the bits of command 310 and data 315. FIG. 4 shows a first part 410 of code 325 added to command 310, and a second part 415 of code 325 added to data 315. But a person skilled in the art will recognize that any manner of distribution may be used, as long as the recipient knows how to identify the bits of code 325.

Figure 5:
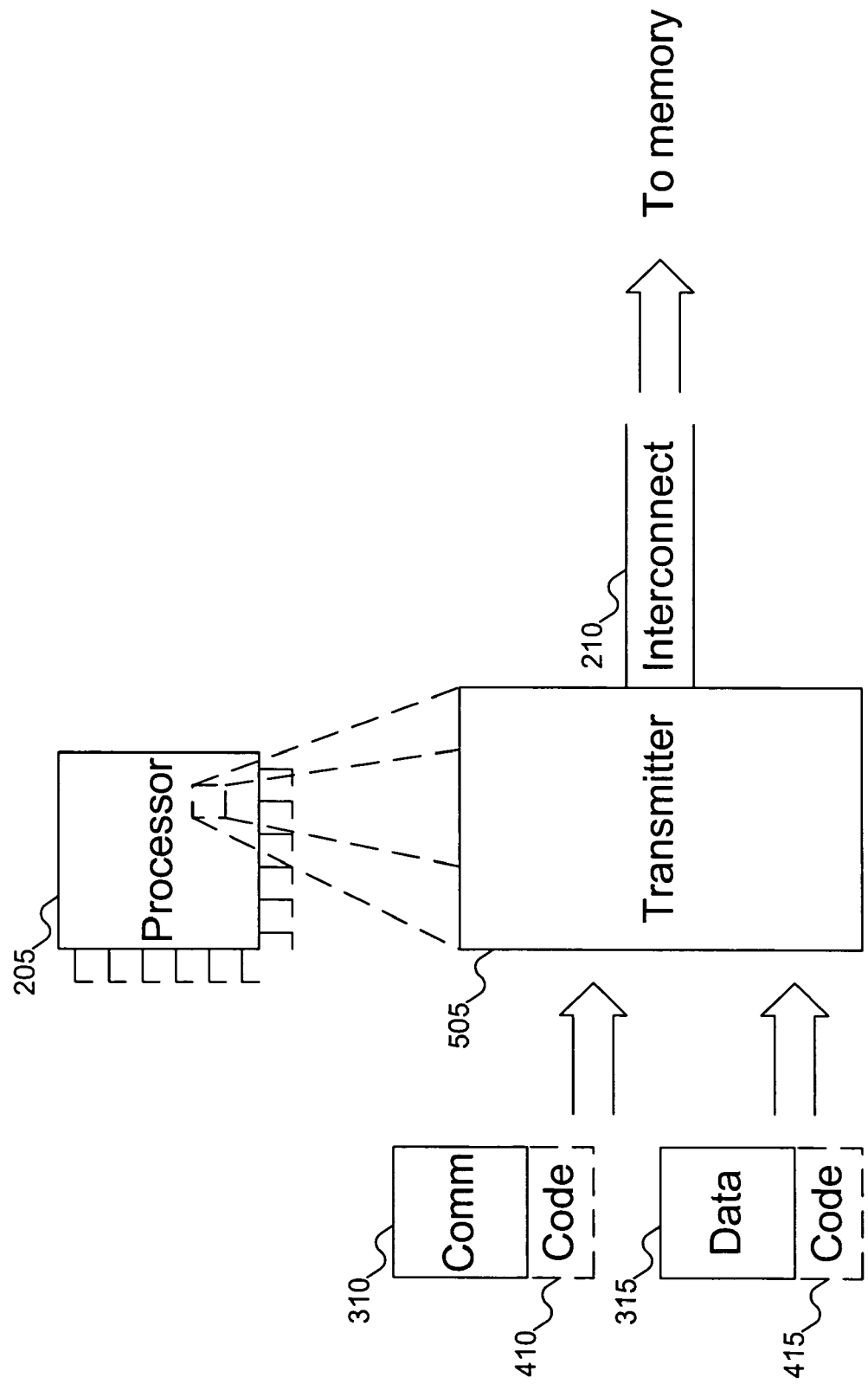
FIG. 5 shows the transmission of the command, data, and error code to the memory of FIG. 2, according to an embodiment of the invention.

FIG. 5 shows the transmission of the command, data, and error code to the memory of FIG. 2, according to an embodiment of the invention. In FIG. 5, processor 205 is shown as including transmitter 505, which transmits command 310, data 315, and the two parts of the code 410 and 415, to the memory module over interconnect 210. Typically, command 310 (and first part 410 of the code) is transmitted separately from data 315 (and second part 415 of the code).

Although FIG. 5 shows transmitter 505 as part of processor 205, a person skilled in the art will recognize that transmitter 505 does not need to be a part of processor 205, nor does the transmission need to be over interconnect 210, provided that transmitter 505 may transmit command 310, data 315, and the code to the appropriate destination (which, of course, does not have to be a memory module).

Figure 6:
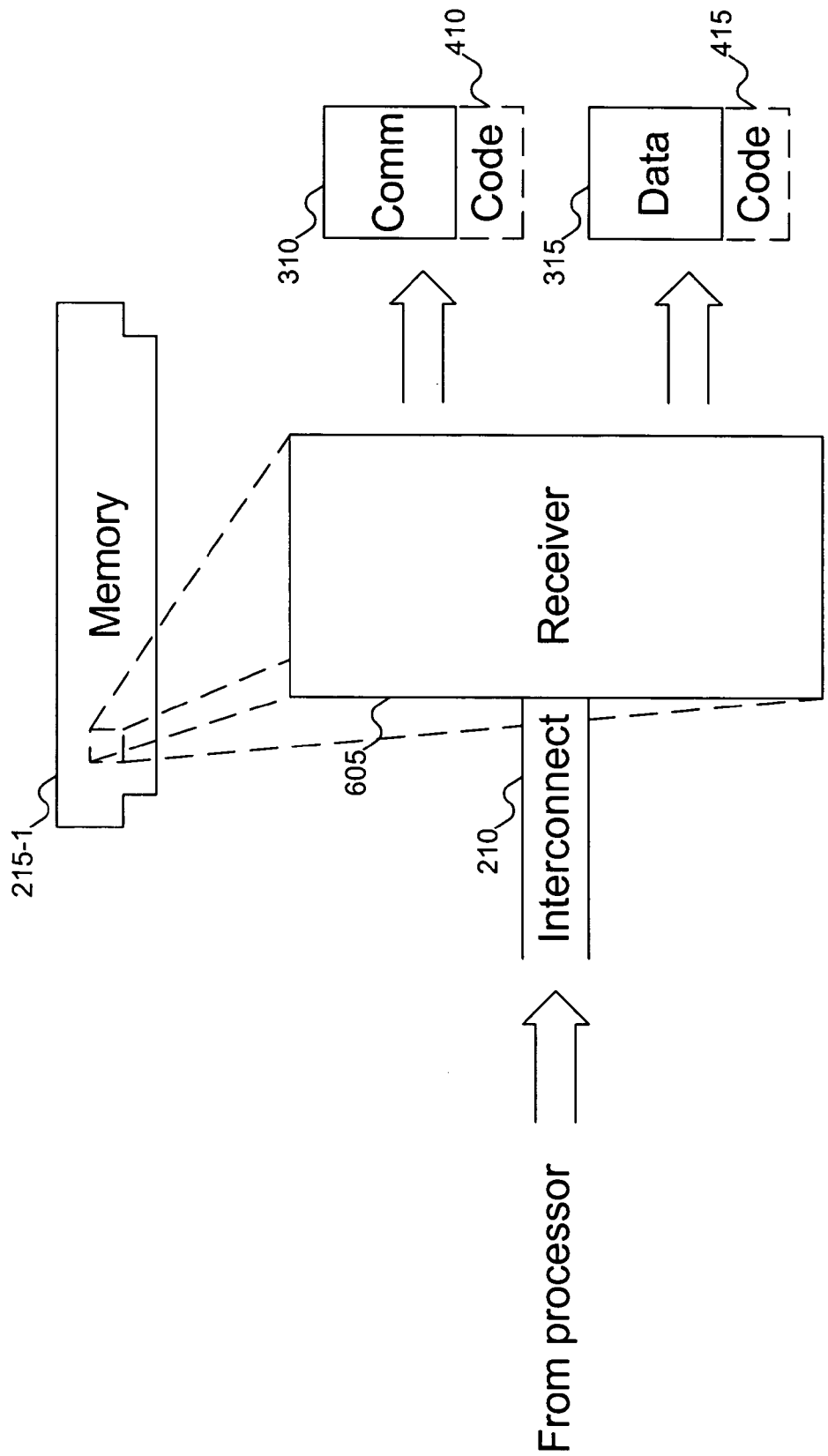
FIG. 6 shows the memory module of FIG. 2 receiving the command, data, and error code as transmitted by the transmitter of FIG. 5, according to an embodiment of the invention.

Continuing the theme of a processor transmitting a write command and data to a memory module, FIG. 6 shows the memory module of FIG. 2 receiving the command, data, and error code as transmitted by the transmitter of FIG. 5, according to an embodiment of the invention. Memory module 215-1 uses receiver 605, built into memory module 215-1, to receive command 310, data 315, and the two parts of the code 410 and 415 from the processor over interconnect 210. A person skilled in the art will recognize that, just as transmitter 505 of FIG. 5 does not need to be part of processor 205, so receiver 605 does not need to be part of memory module 215-1, nor does receiver 605 need to receive command 310, data 315, and the two parts of the code 410 and 415 over interconnect 210: the illustrated embodiment is not exclusive of other implementations.

Figure 7:
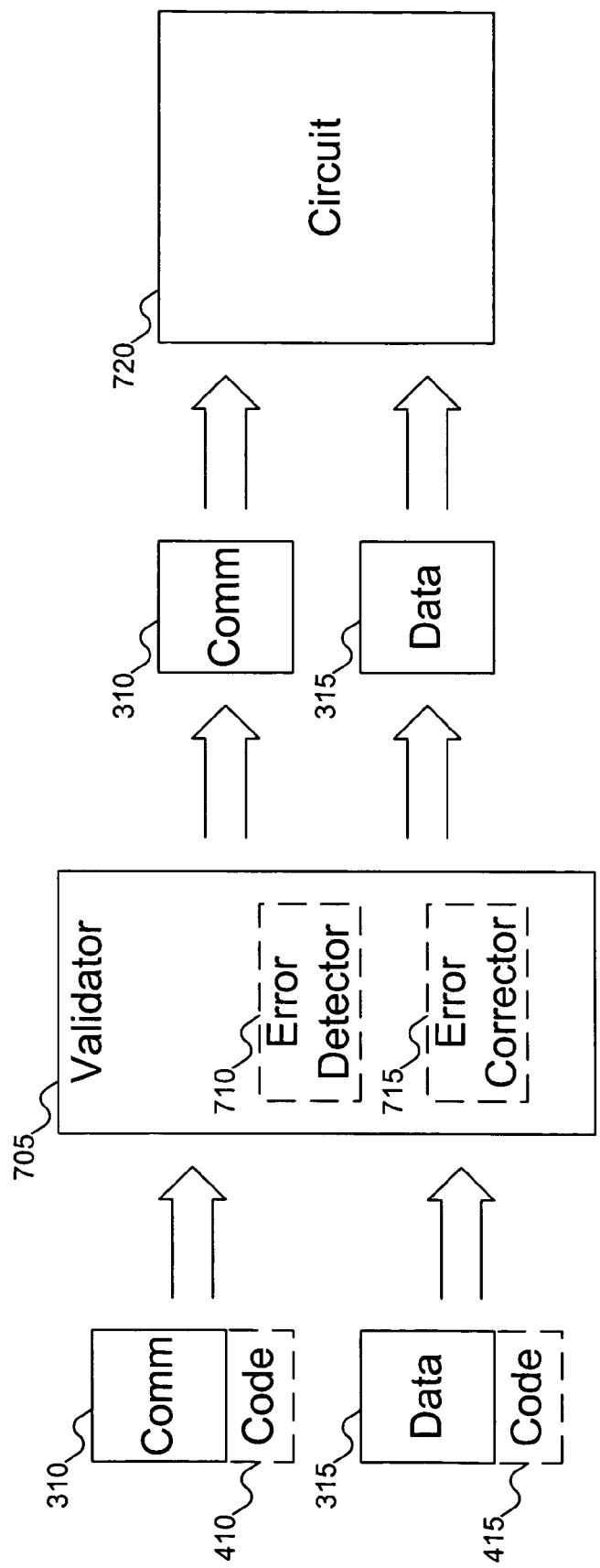
FIG. 7 shows the memory module of FIG. 2 validating and carrying out the command and data transmitted by the transmitter of FIG. 5, according to an embodiment of the invention.

FIG. 7 shows the memory module of FIG. 2 validating and carrying out the command and data transmitted by the transmitter of FIG. 5, according to an embodiment of the invention. Once command 310, data 315, and the parts of the code 410 and 415 are received, validator 705 validates command 310 and data 315 using the code. This may be accomplished by processing command 310 and data 315 to calculate anew the code appropriate for the code generating algorithm, and error detector 710 to compare the result with the transmitted code to see if the results match. If the results do not match, then receiver 605 or memory module 215-1 (of FIG. 6) may request processor 205 of FIG. 5 to retransmit command 310, data 315, and the two parts of the code 410 and 415. Alternatively, if the code includes an error correcting code, then error corrector 715 may be used to correct the error.

Assuming that command 310 and data 315 are validated or successfully corrected, then they may be processed by circuit 720 to perform the command. For example, if command 310 is a command to write data 315 to memory, then circuit 720 may write data 315 to the location specified in memory module 215-1.

It is worth noting that using a single code does not result in increasing the number of requests to retransmit. In the prior art, if there is an error in either the command or the data, then both command 310 and data 315 are requested to be retransmitted. Using a single code does not change that. As indicated above with reference to the discussion surrounding FIG. 3, either fewer bits are used to transmit command 310, data 315, and the code, or greater accuracy may be achieved.

Figure 8:
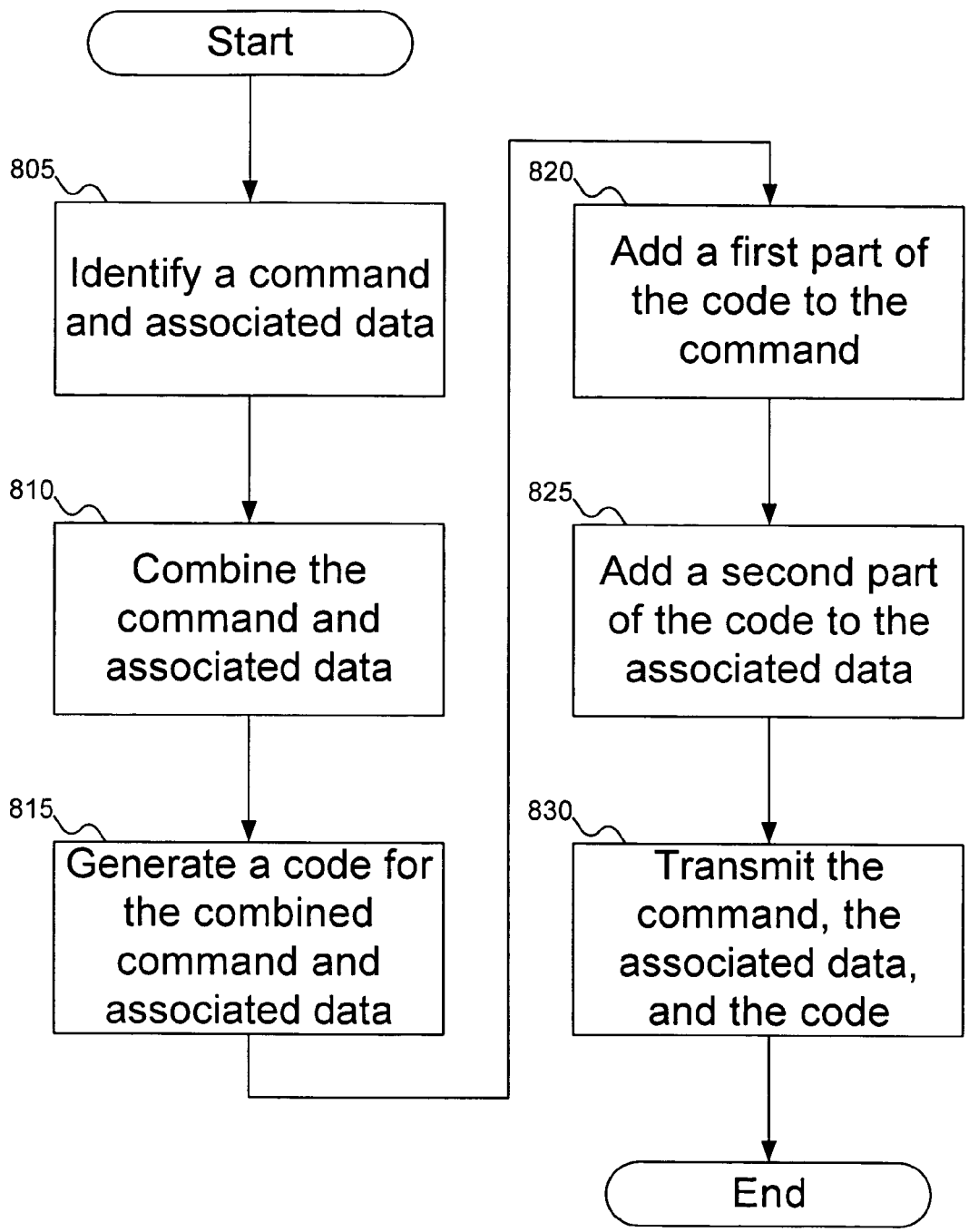
FIG. 8 shows a procedure for generating and transmitting an error code for a command and data in the machine of FIG. 1, according to an embodiment of the invention.

FIG. 8 shows a procedure for generating and transmitting an error code for a command and data in the machine of FIG. 1, according to an embodiment of the invention. In FIG. 8, at block 805, the system identifies a command and an associated data. At block 810, the system combines the command and the associated data. At block 815, the system generates a code for the combined command and associated data. At block 820, the system adds a first part of the code to the command, and at block 825, the system adds a second part of the code to the associated data. Finally, at block 830, the system transmits the command, the associated data, and the code; typically, the command and the associated data (with their respective parts of the code) are transmitted separately.

Although FIG. 8 shows blocks 820-825 as adding parts of the code to the command and the associated data, as discussed above with reference to FIG. 4, the code may be distributed among the command and the associated data in any desired manner. For example, if the code is to be simply appended to the data, then block 820 is not needed, and block 825 may append the entire code to the associated data.

Figure 9A:
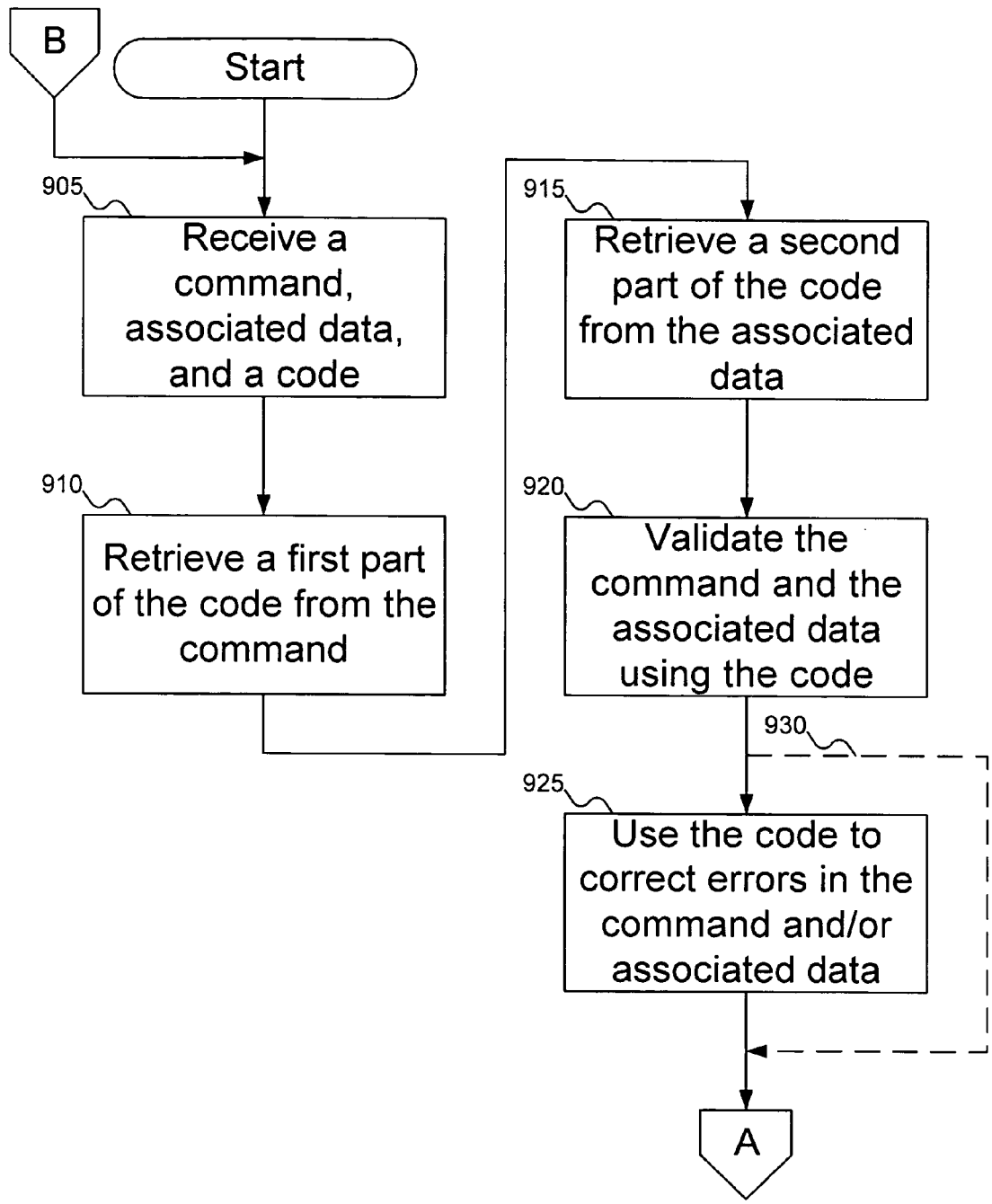
FIGS. 9A-9B show a procedure for receiving and validating a command, data, and error code in the machine of FIG. 1, according to an embodiment of the invention.
Figure 9B:
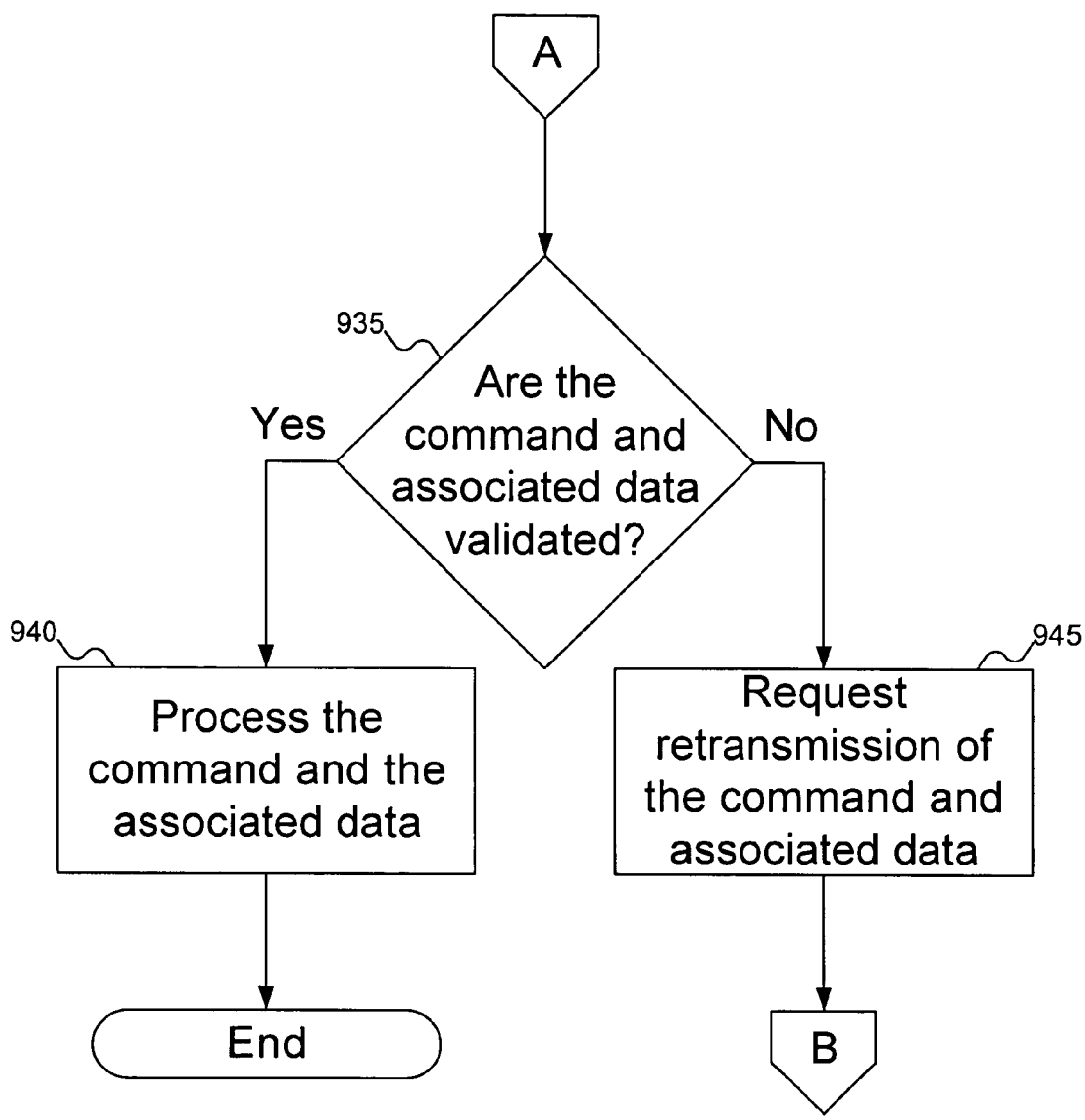

FIGS. 9A-9B show a procedure for receiving and validating a command, data, and error code in the machine of FIG. 1, according to an embodiment of the invention. In FIG. 9A, at block 905, the system receives a command, associated data, and a code. At block 910, the system retrieves a first part of the code from the command, and at block 915, the system retrieves a second part of the code from the associated data. As discussed above with reference to FIGS. 4 and 8, blocks 910-915 may be modified in any desired manner, depending on how the code is distributed among the command and the associated data. At block 920, the system validates the command and the associated data using the code. If the code is an error correcting code, then at block 925 the code may be used to correct errors in the command and the associated data. (If the code is not an error correcting code, then block 925 may be omitted, as shown by dashed line 930.)

At block 935 (FIG. 9B), the system checks to see if the command and the associated data were validated. If the command and the associated data were validated, then at block 940, the system processes the command and the associated data. Otherwise, at block 945, the system requests retransmission of the command, associated data, and code, and processing returns to block 905 in FIG. 9A.

The following discussion is intended to provide a brief, general description of a suitable machine in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Such embodiments may also be referred to as program products. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may also be used in conjunction with communications media such antennas, wires, optical fibers, microwaves, radio waves, and other electromagnetic or optical carriers. Associated data may be delivered over transmission environments, including physical and/or logical networks, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles. And, though the foregoing discussion has focused on particular embodiments, other configurations are contemplated. In particular, even though expressions such as "illustrated embodiment" or the like are used herein, these phrases are meant to generally reference embodiment possibilities, and are not intended to limit the invention to particular embodiment configurations. As used herein, these terms may reference the same or different embodiments that are combinable into other embodiments. Further, the various embodiments may be combined in any manner desired, to produce combinations not specifically discussed herein.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claim is:

1. An apparatus, comprising:
 a source to generate a command and associated data for the command;
 an error code generator to generate a single error code based, at least in part, on the command and the associated data;
 a distributor to distribute the single error code among the command and the associated data; and
 a transmitter to transmit the command and the associated data separately.

2. An article according to claim 1, wherein:
 the error code includes an error correcting code; and
 the error code generator to generate the error correcting code for the command and the associated data.

3. An article, comprising:
 a receiver to receive a command and first corresponding error code, and associated data and second corresponding error code, wherein the first and second corresponding error codes correspond to a single error code generated based, at least in part, on the command and the associated data;
 a validator to validate the command and the associated data using the first and second corresponding error codes; and
 a circuit to process the command and the associated data.

4. An article according to claim 3, wherein:
 the first and second corresponding error codes include an error correcting code; and
 the validator includes:
  an error detector to detect an error in the command and the associated data using the error code; and
  an error corrector to correct the error using the error code.

5. A system, comprising:
 a memory module, including:
  a receiver to receive a command, associated data for the command, and a single error code distributed among the command and the associated data;
  a validator to validate the command and the associated data using the error code; and
  a circuit to process the command and the associated data;
 an interconnect connected to the memory module;
 a source for the command and the associated data;
 an error code generator to generate the single error code for the command and the associated data;
 a distributor to distribute the error code among the command the and associated data; and
 a transmitter to transmit the command, the associated data, and the error code to the memory module using the interconnect.

6. A system according to claim 3, wherein the receiver is operative to receive the command and the first part of the error code separately from the associated data and the second part of the error code.

7. A system according to claim 5, wherein the error code generator additionally generates an error correcting code for the command and the associated data.

8. A system according to claim 7, wherein:
the error code includes an error correcting code; and
the validator includes:
an error detector to detect an error in one of the command and the associated data using the error code; and
an error corrector to correct the error using the error code.

9. A system according to claim 5, further comprising a processor connected to the interconnect and capable of executing the source for the command and the associated data.

10. A method, comprising:
identifying a command and associated data;
combining the command the associated data into a combined data;
generating a single error code based, at least in part, on the combined data; and
distributing the error code among the command and the associated data.

11. A method according to claim 10, further comprising:
receiving the command and the associated data at the memory module;
identifying the error code from the command and the associated data;
validating the command and the associated data using the error code; and
processing the command and the associated data.

12. A method according to claim 11, wherein receiving the command and the associated data includes:
receiving the command and a first part of the error code; and
receiving the associated data and a second part of the error code.

13. A method according to claim 11, wherein:
identifying the error code from the command and the associated data includes identifying an error correcting code from the command and the associated data; and
validating the command and the associated data using the error code includes:
detecting an error in at least one of the command and the associated data using the error correcting code; and
correcting the error using the error correcting code.

* * * * *